(12) United States Patent
Skrepcinski et al.

(10) Patent No.: US 10,122,064 B2
(45) Date of Patent: Nov. 6, 2018

(54) ANTENNA MOUNT

(71) Applicant: CommScope Technologies LLC, Hickory, NC (US)

(72) Inventors: Alan J. Skrepcinski, Plano, TX (US); Kevin L. Rovell, Fort Worth, TX (US); Kevin Ray Paswalk, Watauga, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/800,374

(22) Filed: Nov. 1, 2017

(65) Prior Publication Data

US 2018/0053985 A1  Feb. 22, 2018

Related U.S. Application Data

(62) Division of application No. 15/139,057, filed on Apr. 26, 2016, now Pat. No. 9,812,762.

(60) Provisional application No. 62/307,877, filed on Mar. 14, 2016, provisional application No. 62/154,111, filed on Apr. 28, 2015.

(51) Int. Cl.
  *F16M 13/00* (2006.01)
  *H01Q 1/12* (2006.01)
  *F16M 11/12* (2006.01)

(52) U.S. Cl.
  CPC ......... *H01Q 1/1228* (2013.01); *F16M 11/126* (2013.01)

(58) Field of Classification Search
  CPC .............................. H01Q 1/125; H01Q 1/1228
  See application file for complete search history.

(56) References Cited

U.S. PATENT DOCUMENTS

| | | | |
|---|---|---|---|
| 1,495,536 | A | 5/1924 | Smith |
| 3,790,950 | A | 2/1974 | Smith |
| 4,129,393 | A | 12/1978 | Sickler |

(Continued)

FOREIGN PATENT DOCUMENTS

CN   302982227   10/2014

OTHER PUBLICATIONS

International Search Report and Written Opinion for corresponding PCT Application No. PCT/US2016/029290, dated Jul. 27, 2016, 11 pages.

(Continued)

*Primary Examiner* — Amy J. Sterling
(74) *Attorney, Agent, or Firm* — Myers Bigel, P.A.

(57) ABSTRACT

A mount for an antenna includes: first and second generally C-shaped arms, each with upper and lower free ends; equipment face mounting brackets mounted on the first and second arms; and lower and upper plates mounted to a post. The upper free ends of the first and second arms are pivotally mounted to the upper plate, and the lower free ends of the first and second arms are pivotally mounted to the lower plate, such that the first and second arms are movable between retracted and extended positions. The first and second arms are fixed in the extended position relative to the upper and lower plate via fasteners inserted through holes in the upper and lower free ends of the arms and in the upper plate, the pivotal mounts and the holes defining a desired angle between the first and second arms in the extended position.

4 Claims, 9 Drawing Sheets

(56) References Cited

U.S. PATENT DOCUMENTS

| | | | |
|---|---|---|---|
| 4,677,805 A | 7/1987 | Schleisner | |
| 5,228,258 A | 7/1993 | Onoda | |
| 5,339,957 A * | 8/1994 | Carstens | B65D 21/0224 |
| | | | 106/36 |
| 5,920,291 A | 7/1999 | Bosley | |
| 6,082,068 A | 7/2000 | Fisher | |
| 6,145,269 A | 11/2000 | Fisher | |
| 6,161,359 A | 12/2000 | Ono | |
| D475,555 S | 6/2003 | Lauts | |
| 7,113,145 B1 | 9/2006 | Noble | |
| 7,466,286 B2 * | 12/2008 | Chapman | H01Q 1/1228 |
| | | | 343/874 |
| 7,659,865 B2 * | 2/2010 | Kreitzberg | H01Q 1/1235 |
| | | | 343/880 |
| 7,963,084 B2 | 6/2011 | Merrifield | |
| 8,393,581 B2 | 3/2013 | Keller | |
| 8,746,641 B2 * | 6/2014 | Fackler | H01Q 1/125 |
| | | | 248/292.12 |
| 9,478,845 B2 | 10/2016 | Hemmervall et al. | |
| 2003/0131539 A1 | 7/2003 | Burford | |
| 2007/0205957 A1 | 9/2007 | Chapman | |
| 2007/0261355 A1 * | 11/2007 | Carlisle | H01Q 1/1242 |
| | | | 52/633 |
| 2008/0048928 A1 | 2/2008 | Michaelis | |
| 2010/0269446 A1 | 10/2010 | Merrifield | |
| 2011/0095956 A1 | 4/2011 | Conrad | |
| 2013/0221182 A1 | 8/2013 | Renilson et al. | |
| 2015/0101261 A1 | 4/2015 | Merrifield | |
| 2016/0211569 A1 | 7/2016 | Skrepcinski et al. | |
| 2016/0322697 A1 | 11/2016 | Skrepcinski | |

OTHER PUBLICATIONS

Gen 2, Enhanced Load Frame, 12'-6" Face w/4 × 96" Pipes, Spec Sheet, posted at Talley.com, posting date not given, © 2017 Talley. com [online], [site visited Jan. 9, 2017]. Available from Internet, URL: https://www.talleycom.com/images/pdf/MTSSFG.pdf.

Notification Concerning Transmittal of International Preliminary Report on Patentability corresponding to International Application No. PCT/US2016/029290 dated Nov. 9, 2017.

* cited by examiner

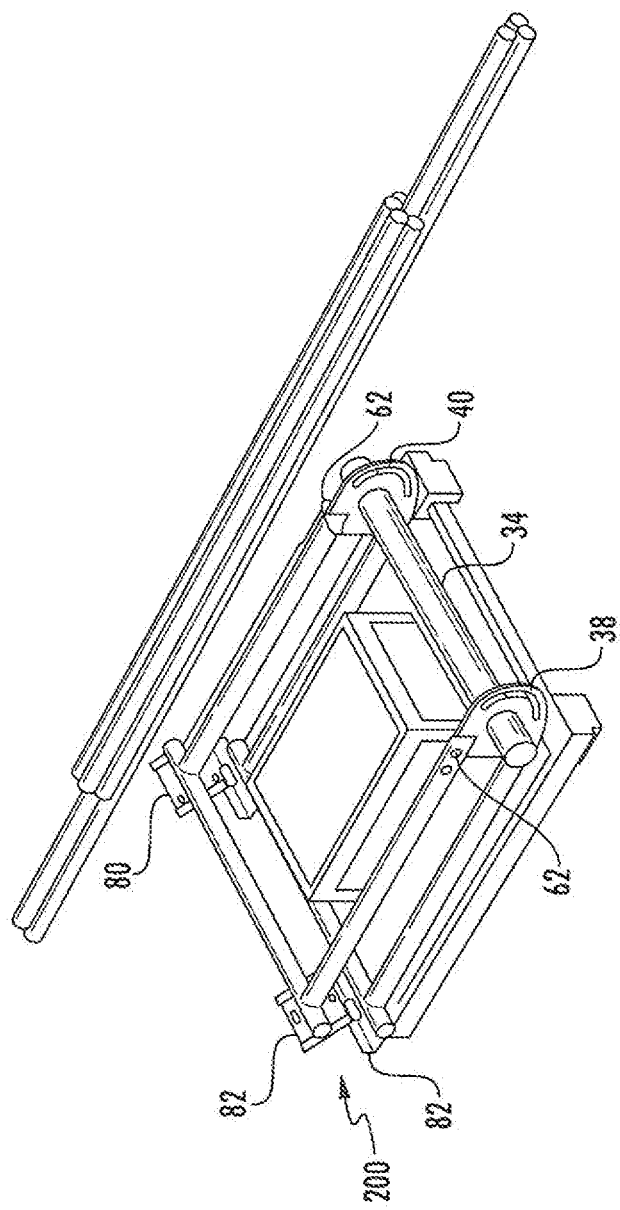

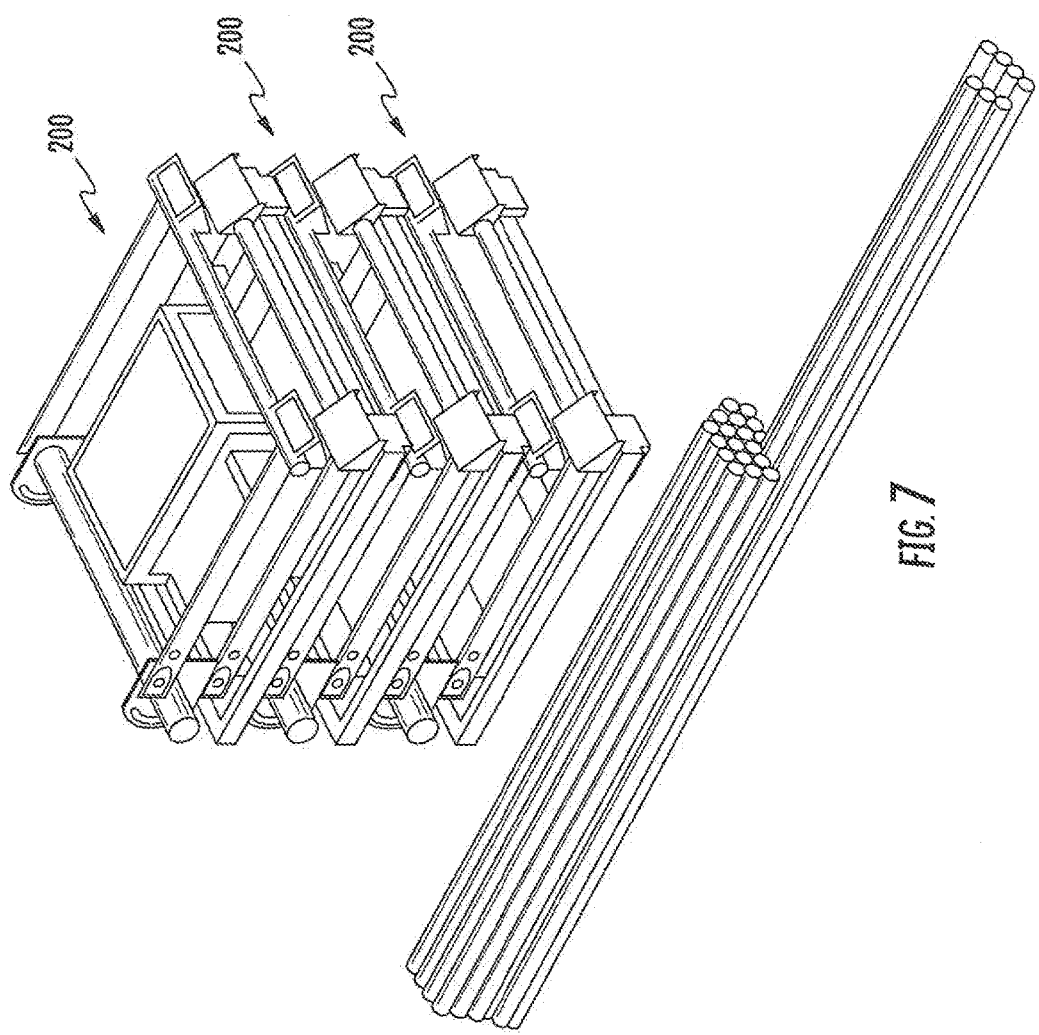

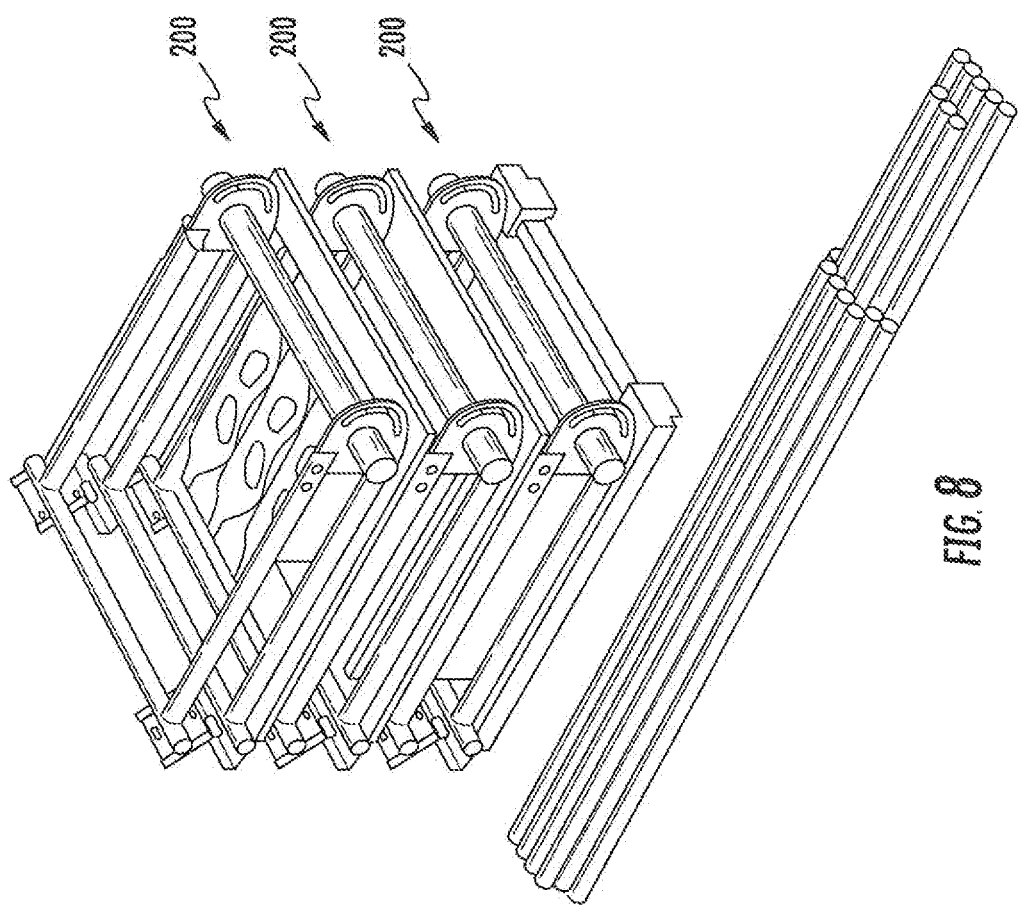

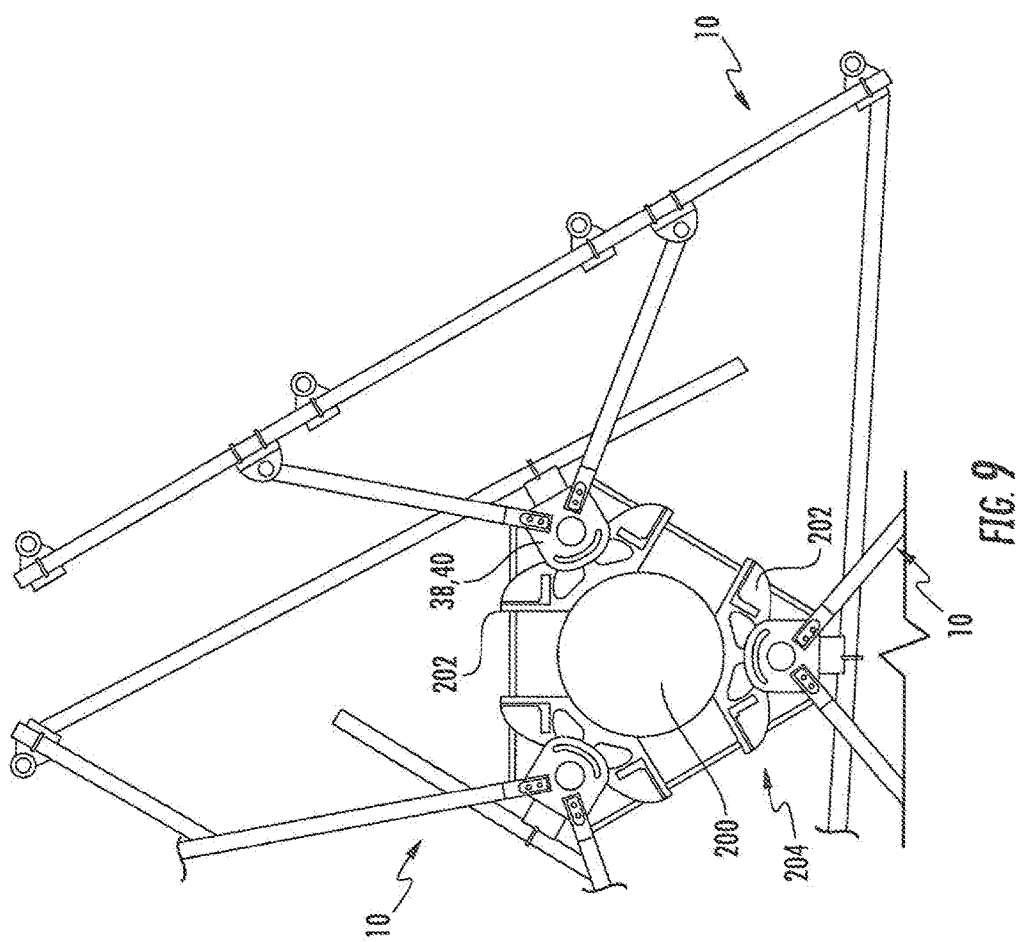

ANTENNA MOUNT

RELATED APPLICATIONS

The present application is a divisional of U.S. patent application Ser. No. 15/139,057, filed Apr. 26, 2016, which claims priority from and the benefit of U.S. Provisional Application No. 62/154,111, filed Apr. 28, 2015, and U.S. Provisional Application No. 62/307,877, filed Mar. 14, 2016, the disclosures of which are hereby incorporated herein in their entirety.

FIELD OF THE INVENTION

The present invention relates generally to mounts for antennas, and more particularly to mounts for antennas on an antenna tower or monopole.

BACKGROUND

With increased demand for more wireless communication, the number of radio and antenna units that a tower traditionally supports has increased and is expected to continue to increase. New towers will need to be designed to support greater numbers of antenna and radio units, while existing towers are retrofitted to support more units, and effort is made to fully utilize space available on the towers.

In addition, antennas are becoming larger in order to handle more wireless traffic. One parameter that influences antenna design is Effective Projected Area (EPA), which is determined by calculations defined by TIA/ANSI-222-G. EPA is intended to predict the effect of wind loading on an antenna structure to enable designers to create a safe design. The configuration of the antenna mount can impact the calculations. As such, minimizing an antenna mount's contribution to EPA can be desirable.

In addition, because antennas are typically mounted on towers well above the ground, technicians working on the antennas and their mounts are at some risk. As a result, a mount design that can reduce the time a technician spends on the tower may also be desirable.

SUMMARY

As a first aspect, embodiments of the invention are directed to a mount for an antenna, comprising: first and second generally C-shaped arms, each with upper and lower free ends; equipment face mounting brackets mounted on the first and second arms; and lower and upper plates mounted to a post. The upper free ends of the first and second arms are pivotally mounted to the upper plate, and the lower free ends of the first and second arms are pivotally mounted to the lower plate, such that the first and second arms are movable between retracted and extended positions. The first and second arms are fixed in the extended position relative to the upper plate via fasteners inserted through holes in the upper free ends of the arms and in the upper plate, and the first and second arms are fixed in the extended position relative to the lower plate via fasteners inserted through holes in the lower free ends of the arms and in the lower plate, the pivotal mounts and the holes defining a desired angle between the first and second arms in the extended position.

As a second aspect, embodiments of the invention are directed to a tilt angle selection mechanism for an antenna mount, comprising: a lower bracket configured to attach to an antenna mount, the lower bracket including lower side panels; an upper bracket configured to attach to the antenna mount, the upper bracket including upper side panels, each of the upper side panels including a plurality of holes; and upper and lower bases for mounting the antenna mount to an antenna tower. The lower side panels are attached to the lower base at a pivotable joint. The upper side panels are attached to the upper base via the insertion of a member through a selected one of the plurality of holes and into the upper base, the insertion of the member preventing pivotal movement of the lower bracket relative to the lower base.

As a third aspect, embodiments of the invention are directed to an azimuth adjustment mechanism for an antenna mount, comprising: upper and lower azimuth plates, each having an arcuate slot; arms attached to the upper and lower azimuth plates, the arms configured for mounting of a frame; a post in which the upper and lower azimuth plates are mounted, wherein the arcuate slots are configured with a radius of curvature that is substantially collinear with an axis defined by the post; and upper and lower brackets attached to the post, each of the brackets having an adjustment member received in the slot of, respectively, the upper and lower azimuth plates so that the frame can rotated about the axis defined by the post.

As a fourth aspect, embodiments of the invention are directed to a package of antenna mounts, comprising a plurality of antenna mounts, each of the antenna mounts comprising: first and second generally C-shaped arms, each with upper and lower free ends; equipment face mounting brackets mounted on the first and second arms; and lower and upper plates mounted to a post. The upper free ends of the first and second arms are pivotally mounted to the upper plate, and wherein the lower free ends of the first and second arms are pivotally mounted to the lower plate, such that the first and second arms are movable between retracted and extended positions. In the retracted position, the first and second arms are pivoted to be generally parallel with each other. The antenna mounts are disposed in vertically stacked relationship. The package further comprises a shipping pallet underlying the stacked antenna mounts.

BRIEF DESCRIPTION OF THE FIGURES

FIG. 6 is a perspective view of a shipping package with one mount of FIG. 1 on a shipping pallet.

FIG. 7 is a perspective view of a shipping package with three mounts of FIG. 1 stacked with interleaved pallets and hardware stored in a central box.

FIG. 8 is a perspective view of a shipping package with three mounts of FIG. 1 stacked with interleaved pallets and hardware for mounting to a monopole positioned therein.

FIG. 9 is a partial top view of three antenna mounts of FIG. 1 mounted to a monopole via a ring mount.

DETAILED DESCRIPTION

Figure 1:
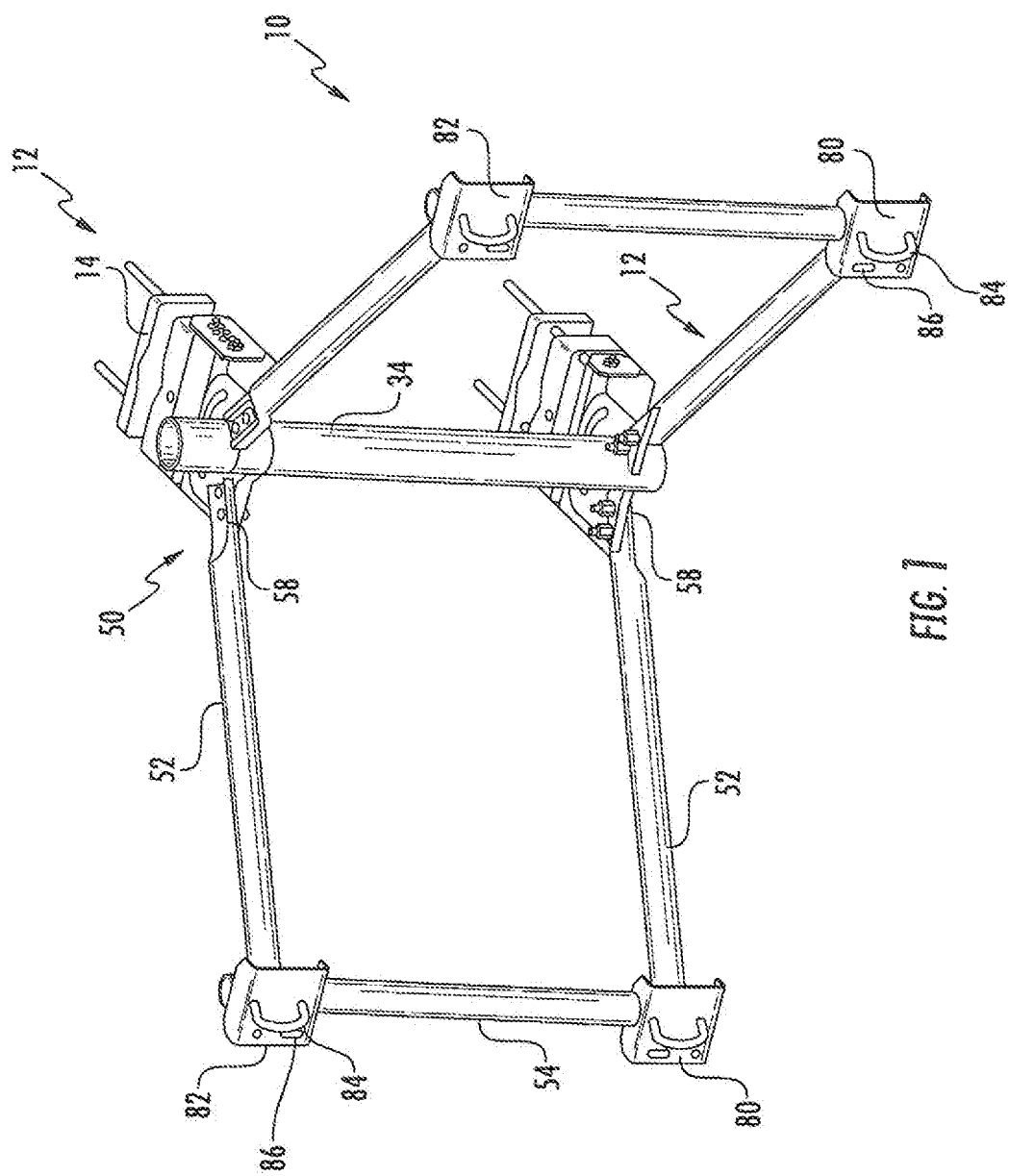
FIG. 1 is a front perspective view of an antenna mount according to embodiments of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Referring now to the figures, an antenna mount, designated broadly at 10, is shown in FIGS. 1-4. The mount 10 includes two pipe clamps 12, each of which includes rear and front pipe clamping jaws 14, 16 connected by bolts 18. The pipe clamps 12 are configured to clamp to a leg of an antenna tower or other mounting structure positioned between the rear and front clamping jaws 14, 16 when the bolts 18 are tightened.

Figure 3:
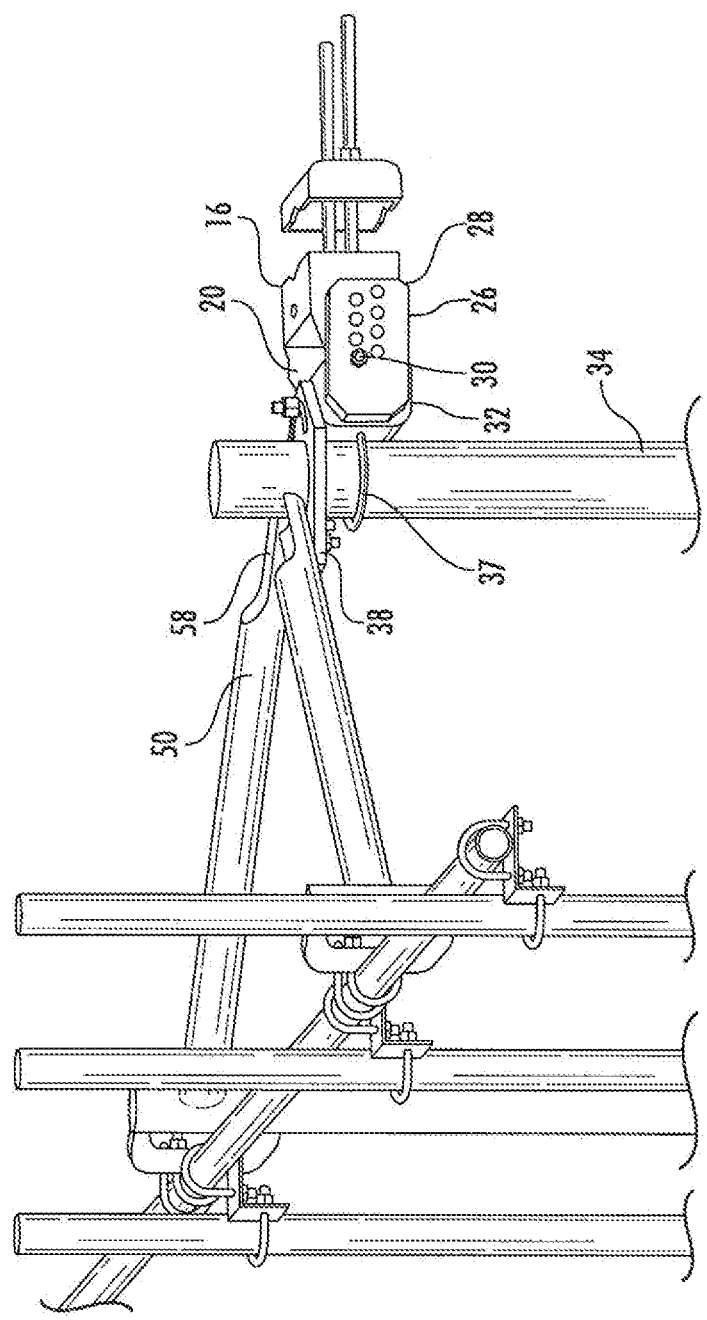
FIG. 3 is a partial front side perspective view of the antenna mount of FIG. 1.
Figure 4:
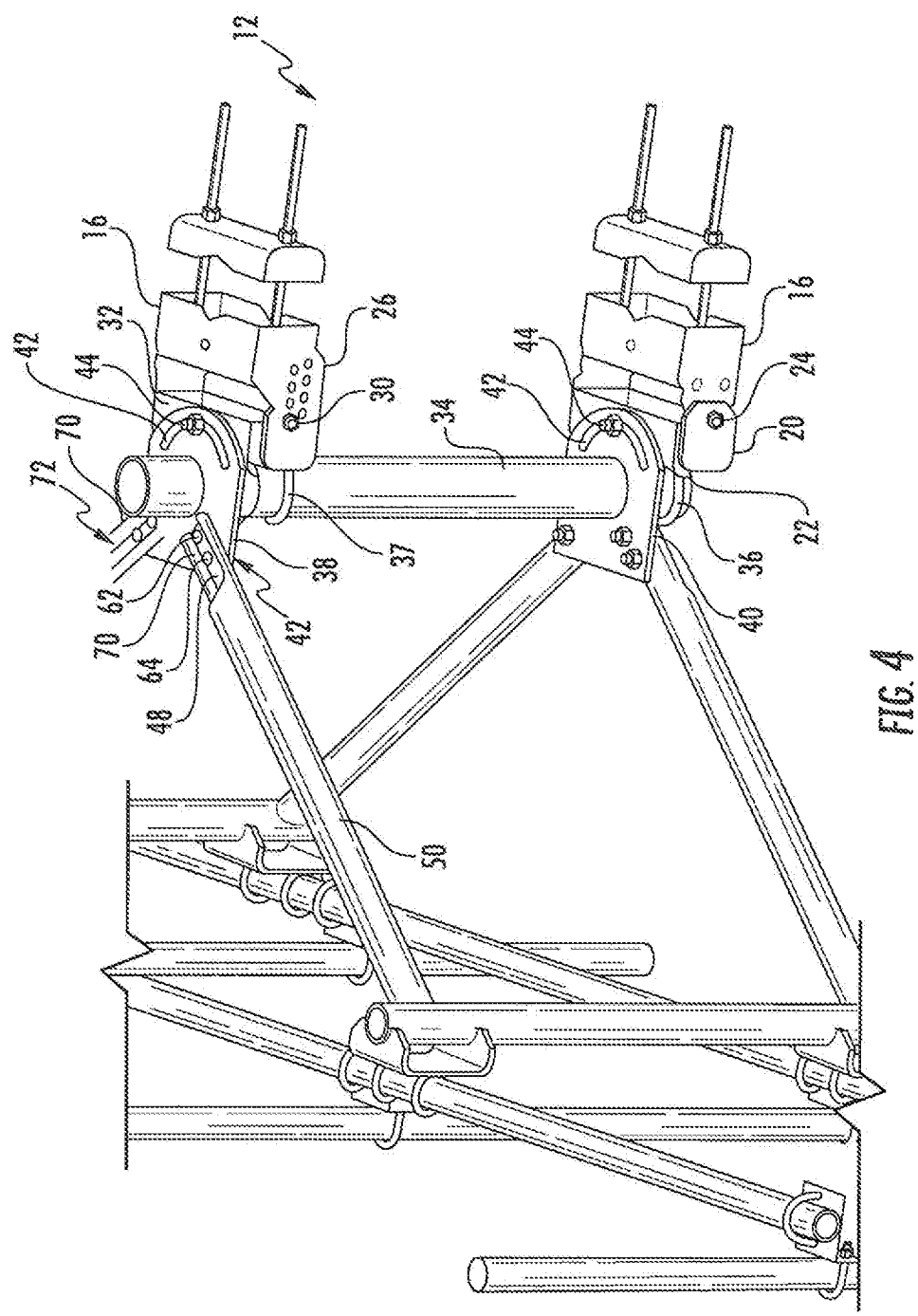
FIG. 4 is a partial rear side perspective view of the antenna mount of FIG. 1.

As can be seen in FIG. 4, two side panels 20 are fixed to opposite side walls of a lower U-bolt bracket 22. Also, each of the side panels 20 is mounted to the lower front clamping jaw 16 via a bolt 24 about which the side panels 20 can pivot. Two side panels 26 are mounted to opposite side walls of an upper U-bolt bracket 32 also, but the side panels 26 include a plurality of mounting holes 28 arranged in two rows, through which a bolt 30 mounts the side panels to the upper clamping jaw 16 (FIG. 3). The plurality of mounting holes 28 enables the relative position of the upper U-bolt bracket 32 to the upper front clamping jaw 16 to be varied, which in turn varies the "tilt" angle of an antenna mounted to the antenna tower to be selected as needed. Each of the holes 28 may be regularly spaced from the other holes 28 to provide incrementally increasing angular tilt; for example, the rightmost hole 28 shown in FIG. 3 may correspond to zero tilt angle, the next rightmost hole 28 may correspond to one degree of tilt, the next rightmost hole 28 may correspond to two degrees of tilt, and so on. Those skilled in this art will recognize that other bases or foundations for mounting of the upper and lower U-bolt brackets to an antenna tower or other mounting structure may be employed.

FIGS. 3 and 4 illustrate that the lower and upper U-bolt brackets 22, 32 are mounted to a cylindrical vertical post 34 via respective U-bolts 36, 37. Upper and lower azimuth adjustment plates 38, 40 are fixed to the vertical post 34. Each of the upper and lower azimuth adjustment plates 38, 40 has an arcuate slot 42 near its rear edge; the arcuate slot 42 has a radius of curvature that is substantially collinear with an axis defined by the vertical post 34. An adjustment bolt 44 (or other adjustment member, such as a pin or the like) is inserted through the slot 42 and into a hole in the upper surface of the corresponding U-bolt bracket 22, 32. When the adjustment bolt 44 is loosened, the upper and lower azimuth plates 38, 40 (and, in turn, the vertical post 34 and structures mounted thereto) are free to rotate relative to the lower and upper U-bolt brackets 22, 32 about the vertical axis defined by the post 34. Thus, the azimuth of an antenna mounted on the mount 10 can be adjusted by simply loosening the adjustment bolts 44, rotating the antenna into the desired position, and tightening the adjustment bolts 44.

Referring still to FIGS. 3 and 4, two frame mounting holes 47, 48 are located near the front corners of the azimuth plates 38, 40. The holes 47, 48 are arranged such that one pair of holes 47, 48 defines an axis that forms a substantially horizontal angle of 120 degrees with the a substantially axis defined by the other pair of holes 47, 48 in the azimuth plates 38, 40.

Referring now to FIGS. 1-4, two generally C-shaped arms 50 are attached at their ends to the upper and lower azimuth plates 38, 40. Each of the arms 50 includes two horizontal runs 52 and a vertical run 54, which in some embodiments are formed as a monolithic component (for example, via welding). At the free ends of the horizontal runs 52, the ends of the arms 50 have flattened sections 58 with two holes 60, 61. Bolts 62, 64 or other threaded or unthreaded fasteners are inserted into the holes 60, 61, then into the holes 47, 48 in the azimuth plates 38, 40, to secure the arm 50 to the upper and lower azimuth plates 38, 40. As can be seen in FIGS. 3 and 4, the flattened section 58 has raised edges 70 that sandwich a recess 72 within which the holes 60, 61 are located. It should also be understood that the bolt 62 may be replaced with another variety of pivotal attachment, such as a pin, post, rivet or the like.

Figure 2:
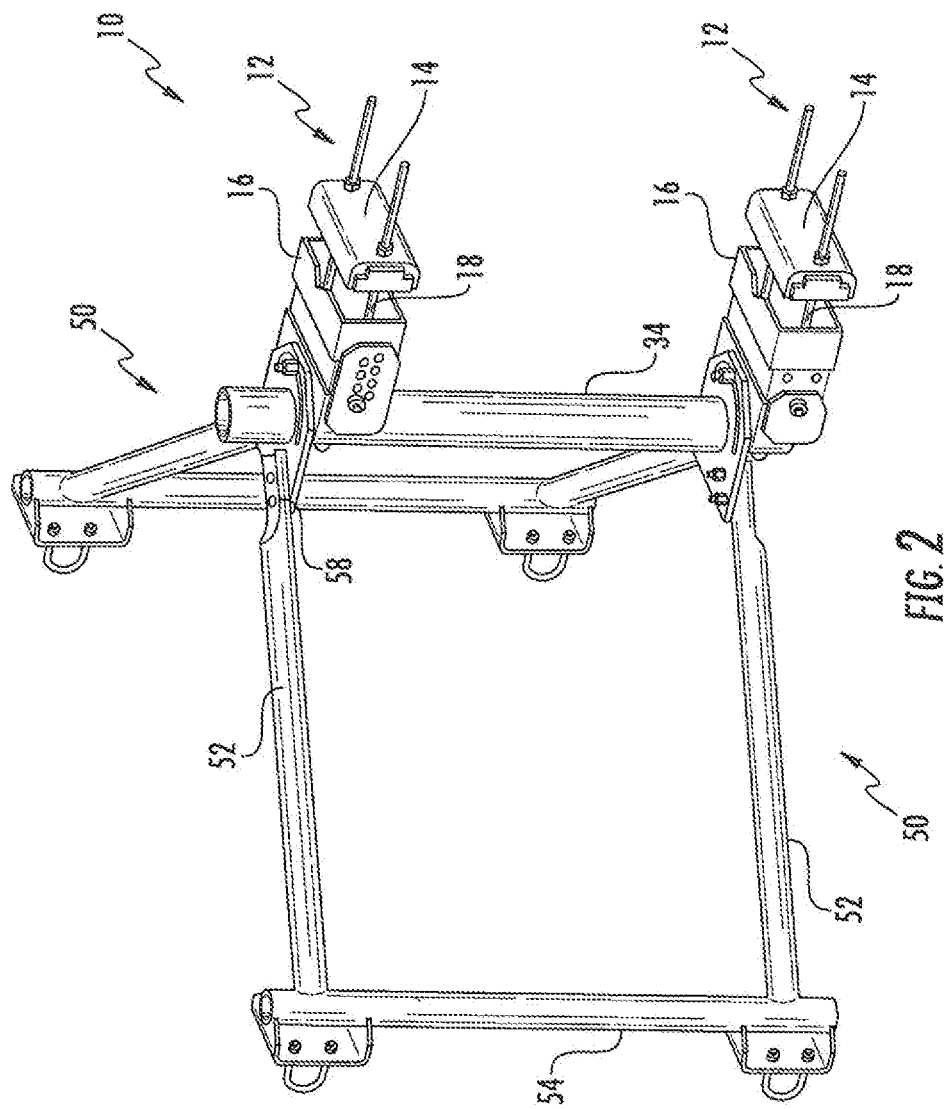
FIG. 2 is a rear perspective view of the antenna mount of FIG. 1.

Referring now to FIGS. 1 and 2, two equipment face mounting brackets 80, 82 are mounted at the intersections or vertices between the vertical run 54 and the horizontal runs 52 of each arm 50. Each of the equipment face mounting brackets 80, 82 includes a base panel 84 with mounting holes 86. The equipment face mounting brackets 80, 82 are welded or otherwise fixed to the arms 50 so that the base panels 84 are substantially coplanar to facilitate mounting of equipment.

Figure 5:
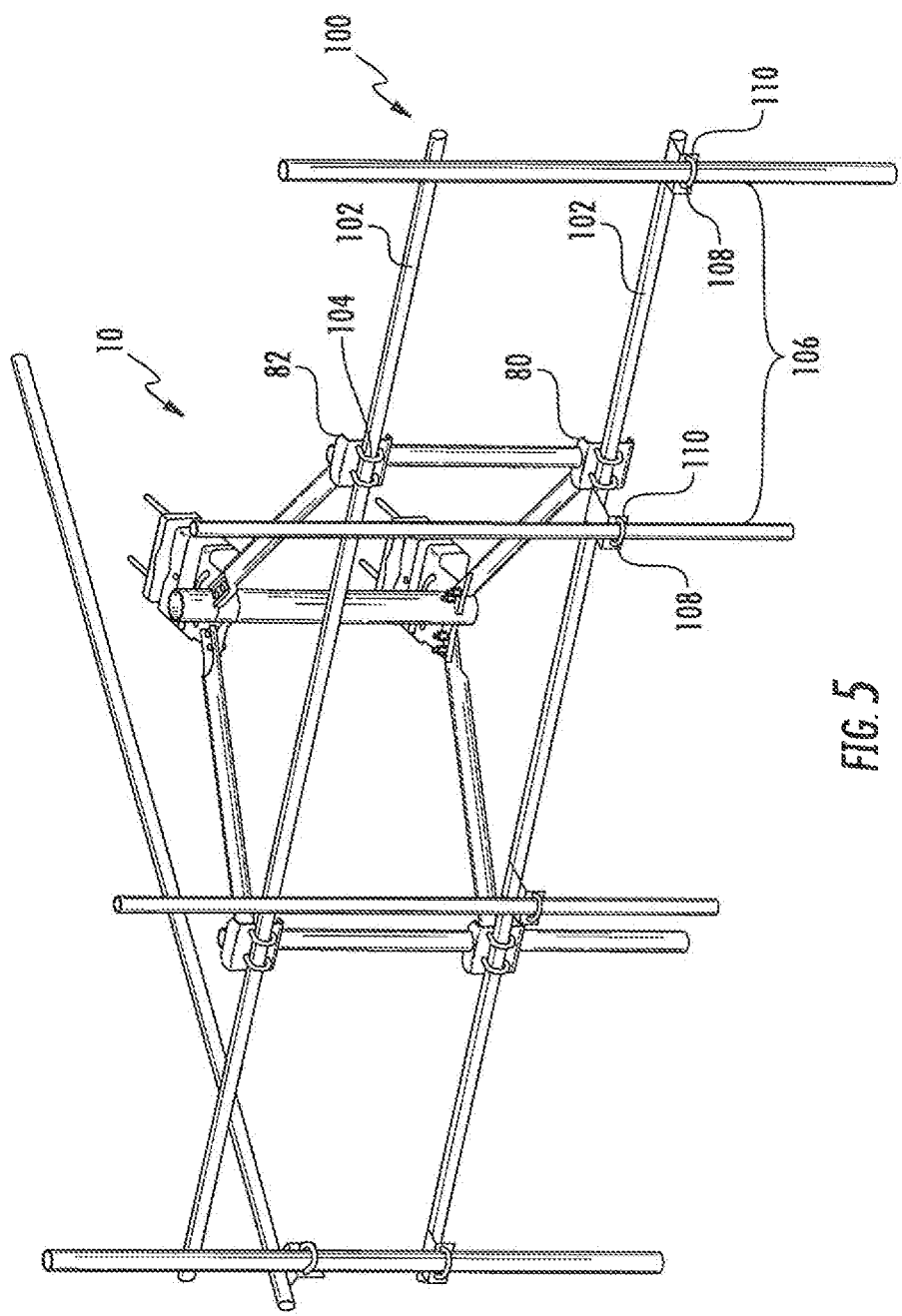
FIG. 5 is a front perspective view of the antenna mount of FIG. 1 with an equipment frame mounted thereon.

Referring now to FIG. 5, a frame 100 for antenna mounting is shown mounted to the equipment face mounting brackets 80, 82. The frame 100 includes two horizontal tubes 102 that are mounted to the equipment face mounting brackets 80, 82 via U-bolts 104 or the like. Notably, the horizontal tubes 102 are positioned at essentially the same elevation as the horizontal runs 52 of the arms 50, which can reduce EPA. Vertical tubes 106 (in the illustrated embodiment four vertical tubes 106 are present) are mounted to the horizontal tubes 102 via U-bolts 108 inserted into holes in mounting brackets 110 fixed to the horizontal tubes 102. The vertical tubes 106 then provide mounting locations for antennas.

One of the advantages that can be provided by the mount described above is related to packaging and shipping. As can be seen in FIG. 6, a dissembled subassembly 200 of the mount 10 can be provided that includes the arms 50 with the equipment face mounting brackets 80, 82 welded thereto, the vertical post 34, and the upper and lower azimuth plates 38, 40. Each of the arms 50 is attached to the upper azimuth plate 38 with only the bolt 62 and to the lower azimuth plate 40 only with the bolt 62. As such, the arms 50 can be pivoted relative to the upper and lower azimuth plates 38, 40 to a retracted position in which they are substantially parallel with each other, thereby forming a substantially level structure.

In this configuration, the subassembly 200 forms a structure that can be easily vertically stacked, either to form a stack of subassemblies 200 themselves or, as can be seen in FIGS. 7 and 8, as an alternating series of layers with pallets 210 or other packaging layer to form an easily shipped package (in either instance, a stack of three mounts 10 would be typical to surround a position on an antenna tower). FIG. 7 shows three subassemblies 200 stacked on pallets 210 with a box 220 of hardware contained within the package for shipping, and FIG. 8 shows three subassemblies 200 stacked on three pallets 210 with unboxed hardware 230 contained within the package for shipping.

The aforementioned configuration can also facilitate assembly of the mount 10. When the subassembly is removed from its "parallel" state described above, the arms 50 can be pivoted relative to the upper and lower azimuth plates 38, 40 about the axis defined by the bolts 62 until the holes 61 of the arms 50 align with holes 48 in the azimuth plates 38, 40. Bolts 64 can then be inserted into the holes 61, 48 and secured with nuts. Thus, through only this simple process, the arms 50 can be pivoted to and fixed in an extended position at the desired angle of 120 degrees. Both the mounting/alignment of the arms 50 and the azimuth adjustment are achieved with the same components (namely, the lower and upper azimuth plates 38, 40).

Also, because the equipment face mounting brackets 80, 82 are already fixed relative to the arms 50, once the arms 50 are pivoted and fixed in the extended position as described immediately above (and as shown in FIGS. 1 and 2), the equipment face mounting brackets 80, 82 are mechanically properly positioned to be coplanar with each other for mounting of the frame 100.

It should also be noted that the presence of the raised edges 70 and recess 72 in the flattened section 58 of the arms 50 can further facilitate assembly. The width of the recess 72 can be selected to approximate the width of the head of the bolt 64, which may be a square head or hex head bolt. As such, insertion of the bolt 64 through the hole 61 positions the head of the bolt 64 within the recess 72, where the raised edges 70 can prevent the bolt head from rotating. This inhibition of rotation of the bolt 64 renders securing of the bolt 64 with a nut much easier, as it can be achieved with a single wrench or similar tool.

In addition, in some embodiments a label (such as an etched bar code or the like) is included on the mount 10 to enable the mount 10 to be tracked. Potentially pertinent information may include the source of materials, the manufacturing date, lot and site, the packaging and/or shipping date, instructions for assembly, and the like.

Construction and installation of the mount 10 typically proceeds according to the following steps:

(a) the arms 50 are unfolded from their parallel position to a position 120 degrees apart, and are secured with the bolts 64;

(b) the horizontal tubes 102 are secured to the equipment face mounting brackets with U-bolts 104;

(c) the vertical tubes 106 are secured to the horizontal tubes 102 with U-bolts 108 to form the frame 100;

(d) the front and rear pipe clamping jaws 14, 16 are mounted to a tower leg at the desired height;

(e) the mount 100 is raised to the proper height, and the lower side panels 20 are attached to the lower front pipe clamping jaw 16 via the bolt 24;

(f) the upper side panels 20 are attached to the upper front pipe clamping jaw 16 via the bolt 32 positioned in the desired mounting hole 28 to set the desired tilt angle;

(g) the upper and lower azimuth plates 38, 40 are rotated relative to the lower and upper U-bolt brackets 22, 32 to orient the frame 100 as desired, and the adjustment bolts 44 are tightened; and (h) the antenna (or other equipment) is raised and mounted on the frame 100.

Although the mount 10 is illustrated for mounting to a leg of a tower, those skilled in this art will appreciate that the mount 10 may also be mounted to other structures. For example, FIG. 9 illustrates three mounts 10 attached to a monopole 200. In such a configuration, the upper and lower azimuth plates 38, 40 of each mount are attached to respective brackets 202 of a ring mount 204 that is in turn attached to the monopole 200. Other mounting structures may also be employed, in which case other hardware may be used to attach the mounts 10 thereto.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

That which is claimed is:

1. A package of antenna mounts, comprising:
  (a) a plurality of antenna mounts, each of the antenna mounts comprising:

first and second generally C-shaped arms, each with upper and lower free ends;

equipment face mounting brackets mounted on the first and second arms;

lower and upper plates mounted to a post;

wherein the upper free ends of the first and second arms are pivotally mounted to the upper plate, and wherein the lower free ends of the first and second arms are pivotally mounted to the lower plate, such that the first and second arms are movable between retracted and extended positions about respective first and second parallel, non-coincident axes;

wherein in the retracted position, the first and second arms are pivoted to be generally parallel with each other;

wherein the antenna mounts are disposed in vertically stacked relationship; and (b) a shipping pallet underlying the stacked antenna mounts.

2. The package defined in claim 1, wherein the stacked antenna mounts are separated from each other by packaging layers.

3. The package defined in claim 1, wherein the first and second arms are fixed in the extended position relative to the upper plate via fasteners inserted through holes in the upper free ends of the arms and in the upper plate, and the first and second arms may be fixed in the extended position relative to the lower plate via fasteners inserted through holes in the lower free ends of the arms and in the lower plate, the pivotal mounts and the holes defining a desired angle between the first and second arms in the extended position.

4. The package defined in claim 1, wherein the upper plate is an upper azimuth plate having an arcuate slot, and wherein a bracket is attached to the post, the bracket having an adjustment member received in the slot so that the mount can rotate about an axis defined by the post.

* * * * *